United States Patent
Wilson

(10) Patent No.: US 11,051,458 B2
(45) Date of Patent: Jul. 6, 2021

(54) HIGH REACHING PRUNING APPARATUS

(71) Applicant: John Wilson, Vista, CA (US)

(72) Inventor: John Wilson, Vista, CA (US)

(*) Notice: Subject to any disclaimer, the term of this patent is extended or adjusted under 35 U.S.C. 154(b) by 0 days.

(21) Appl. No.: 16/883,967

(22) Filed: May 26, 2020

(65) Prior Publication Data

US 2021/0037716 A1    Feb. 11, 2021

Related U.S. Application Data

(60) Provisional application No. 62/883,884, filed on Aug. 7, 2019.

(51) Int. Cl.
*A01G 3/08* (2006.01)
*B25H 1/00* (2006.01)

(52) U.S. Cl.
CPC ............. *A01G 3/085* (2013.01); *A01G 3/083* (2013.01); *B25H 1/0035* (2013.01)

(58) Field of Classification Search
CPC ........ A01G 3/085; A01G 3/081; A01G 3/033; A01G 3/0035; A01G 3/037; B23D 51/03; B23D 51/0255; B23D 51/0335; B23D 51/033; B23D 51/037; B23D 49/16; F16P 1/00; Y10T 24/13
USPC .... 408/136; 30/296.1, 294.4, 249, 297, 231; 56/241
See application file for complete search history.

(56) References Cited

U.S. PATENT DOCUMENTS

| | | | | |
|---|---|---|---|---|
| 1,486,140 A | * | 3/1924 | Hickey | A01G 3/053 185/39 |
| 2,195,045 A | * | 3/1940 | Bernay | A01G 3/0255 30/242 |
| 2,399,393 A | * | 4/1946 | Schillinger | B27B 21/04 30/371 |
| 2,600,540 A | * | 6/1952 | Johnson | A01G 3/033 47/1.01 R |
| 2,619,721 A | * | 12/1952 | King | B27B 19/09 30/371 |
| 2,879,677 A | * | 3/1959 | Baublitz | B25H 1/0035 173/141 |
| 2,908,482 A | * | 10/1959 | Curtis | E21B 19/087 173/161 |
| 2,947,204 A | * | 8/1960 | Pine | B25H 1/0035 173/141 |
| 3,340,612 A | * | 9/1967 | Knight | A01G 3/08 30/394 |

(Continued)

FOREIGN PATENT DOCUMENTS

| | | | | |
|---|---|---|---|---|
| DE | 3339767 A1 | * | 5/1985 | ............. A01G 3/037 |
| DE | 202017004012 U1 | * | 9/2017 | ............. A01G 3/083 |

(Continued)

OTHER PUBLICATIONS

KR2018057228 A English Translation; May 2018 ; Kim Keun Hye; A01G3/085.*

(Continued)

*Primary Examiner* — Laura M Lee
(74) *Attorney, Agent, or Firm* — US IP Attorneys, P.C.; Timothy Marc Shropshire

(57) ABSTRACT

A high reaching pruning apparatus having an elongated telescoping pole, a foot brace and a hook for grasping a tree limb. The high reaching pruning apparatus has an opening in the hook for receiving a saw blade.

12 Claims, 9 Drawing Sheets

(56) References Cited

U.S. PATENT DOCUMENTS

| | | | | |
|---|---|---|---|---|
| 3,715,805 | A * | 2/1973 | Fraser | A01G 3/08 30/166.3 |
| 4,654,971 | A * | 4/1987 | Fettes | A01G 3/08 30/296.1 |
| 4,733,470 | A * | 3/1988 | Firman | A01G 3/037 30/231 |
| 5,014,430 | A * | 5/1991 | Wortham | B23D 51/01 30/165 |
| 5,107,933 | A * | 4/1992 | Wuhrer | E21B 21/00 173/1 |
| 5,295,620 | A * | 3/1994 | Cousineau | B25H 1/0035 173/170 |
| 5,367,773 | A * | 11/1994 | Robbins | A01G 3/0255 30/228 |
| 5,820,317 | A * | 10/1998 | Van Troba | B25H 1/0035 408/136 |
| 5,894,667 | A * | 4/1999 | Van Den Hout | A01G 3/0255 30/249 |
| 6,095,724 | A * | 8/2000 | Hurt | B25H 1/0035 408/136 |
| 6,345,445 | B1 * | 2/2002 | Schofield | A01G 3/083 30/245 |
| 7,462,004 | B2 * | 12/2008 | Kopp | B25H 1/0064 408/102 |
| 7,926,186 | B2 * | 4/2011 | McLoughlin | A62C 8/00 30/244 |
| 7,937,839 | B2 * | 5/2011 | Fidgen | A01G 3/0255 30/135 |
| 8,191,268 | B2 * | 6/2012 | Willetts | B23D 51/01 30/392 |
| 8,782,910 | B1 * | 7/2014 | Lofton | B23D 59/00 30/297 |
| 2005/0247523 | A1 * | 11/2005 | Sewell | B26B 11/00 182/187 |
| 2017/0086396 | A1 * | 3/2017 | Burch | A01G 7/06 |
| 2018/0156385 | A1 * | 6/2018 | Giglio | F16P 1/00 |
| 2021/0037716 | A1 * | 2/2021 | Wilson | A01G 3/083 |

FOREIGN PATENT DOCUMENTS

| | | | | |
|---|---|---|---|---|
| EP | 0211182 | A2 * | 2/1987 | A01G 3/08 |
| FR | 1198746 | A * | 12/1959 | A01G 3/033 |
| KR | 2018057228 | A * | 5/2018 | A01G 3/085 |

OTHER PUBLICATIONS

DE202017004012 English Translation; Sep. 6, 2017; VAIC Helmut; A01G3/083.*

* cited by examiner

HIGH REACHING PRUNING APPARATUS

CROSS REFERENCE TO RELATED APPLICATIONS

The following application is a based on and claims the priority benefit of U.S. provisional application Ser. No. 62/883,884 filed Aug. 7, 2020; the entire content of which is incorporated by reference.

BACKGROUND OF THE INVENTION

A high reaching pruning apparatus is provided. The high reaching pruning apparatus has an elongated telescoping pole, a foot brace and a hook for grasping a tree limb. The high reaching pruning apparatus is suitable for easily pruning tall trees.

While there are some devices known to help someone prune or trim tall trees, prior trimming devices fail to describe a high reaching pruning apparatus which is easy to use. Further, these prior devices fail to provide for a high reaching pruning apparatus which has a foot brace and a tree limb hook which allows for easy trimming of a tree.

SUMMARY OF THE INVENTION

A high reaching pruning apparatus is provided. The high reaching pruning apparatus has an elongated telescoping pole, a foot brace and a hook for grasping a tree limb. The high reaching pruning apparatus is suitable for easily pruning and trimming tall trees.

An advantage of the present high reaching pruning apparatus is that the present high reaching pruning apparatus may have a foot brace for stabilizing the apparatus during use.

And another advantage of the present high reaching pruning apparatus is that the present high reaching pruning apparatus may have at least one spike on the underside of a foot brace for better securing the apparatus during use.

Yet another advantage of the present high reaching pruning apparatus is that the present high reaching pruning apparatus may telescopically expand.

And an advantage of the present high reaching pruning apparatus is that the present device has a hook which stabilizes the saw during the cutting and pruning of the tree.

For a more complete understanding of the above listed features and advantages of the high reaching pruning apparatus reference should be made to the detailed description and the drawings. Further, additional features and advantages of the invention are described in, and will be apparent from, the detailed description of the preferred embodiments.

DETAILED DESCRIPTION OF THE PREFERRED EMBODIMENTS

A high reaching pruning apparatus is provided. The high reaching pruning apparatus has an elongated telescoping pole, a foot brace and a hook for grasping a tree limb. The high reaching pruning apparatus is suitable for easily pruning and trimming tall trees.

Figure 1:
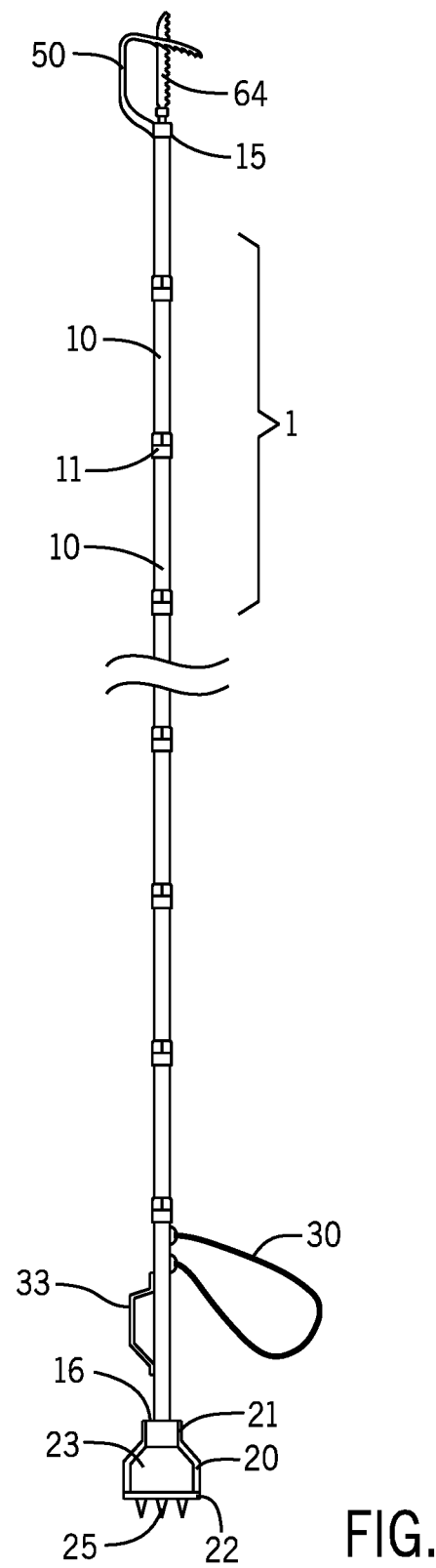
FIG. 1 illustrates a side view of the high reaching pruning apparatus in the expanded orientation.
Figure 2:
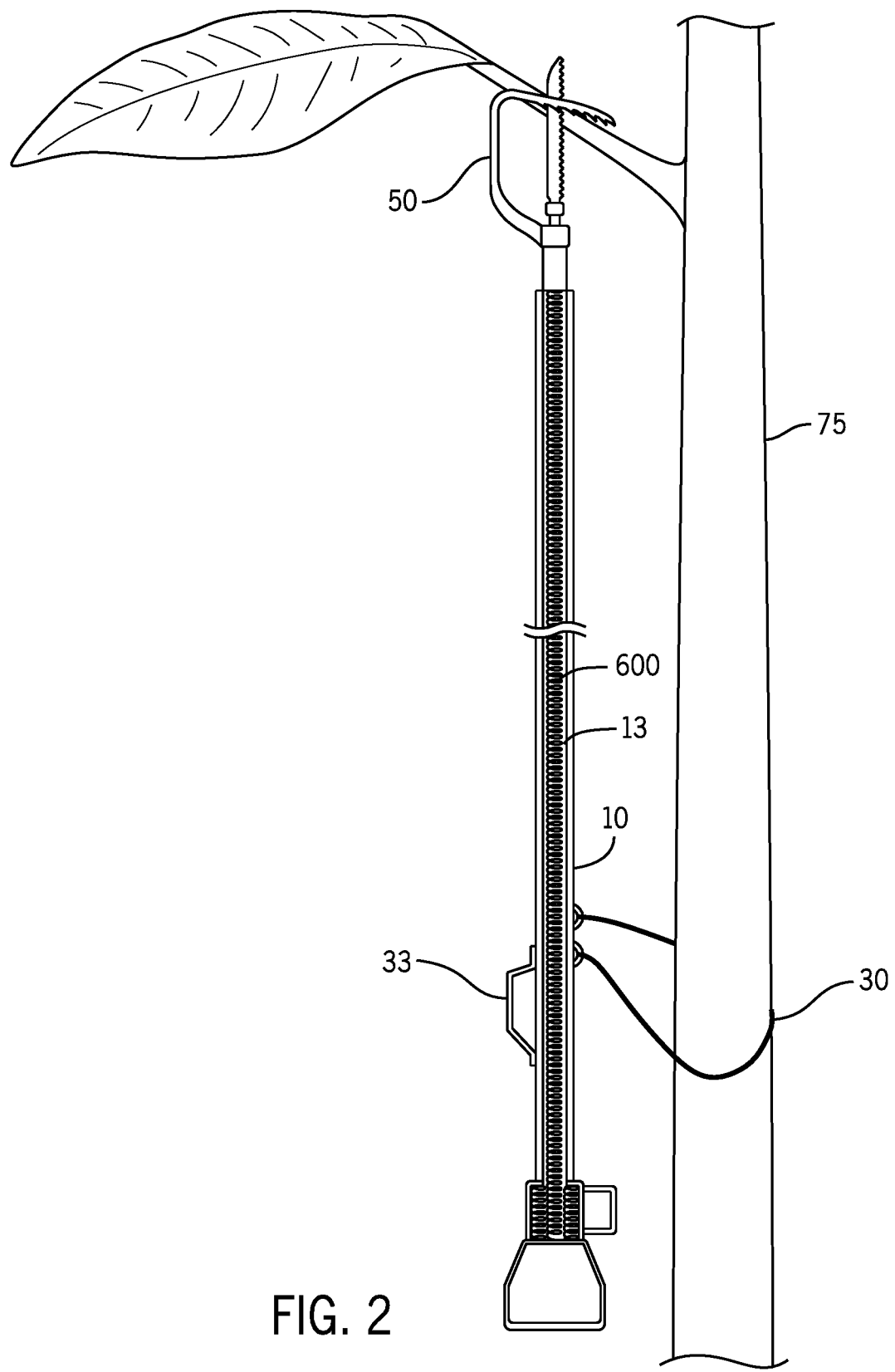
FIG. 2 illustrates an internal view of the high reaching pruning apparatus in an embodiment.

Referring first to FIG. 1, in an embodiment, a high reaching pruning apparatus 1 is provided. The present high reaching pruning apparatus 1 may have an extended pole having a plurality of individual sections 10 secured together at joints 11. Preferably, the individual sections are made of a strong carbon fiber material. The plurality of individual sections 10 may have an interior 13. Prior art pruning/trimming devices are held in the hand of a person and, therefore, become heavy to hold after a while. The present device 1 is secured to the ground (as discussed below) and therefore the user does not need to carry the weight of the device, which may have a motor, during use.

Figure 7:
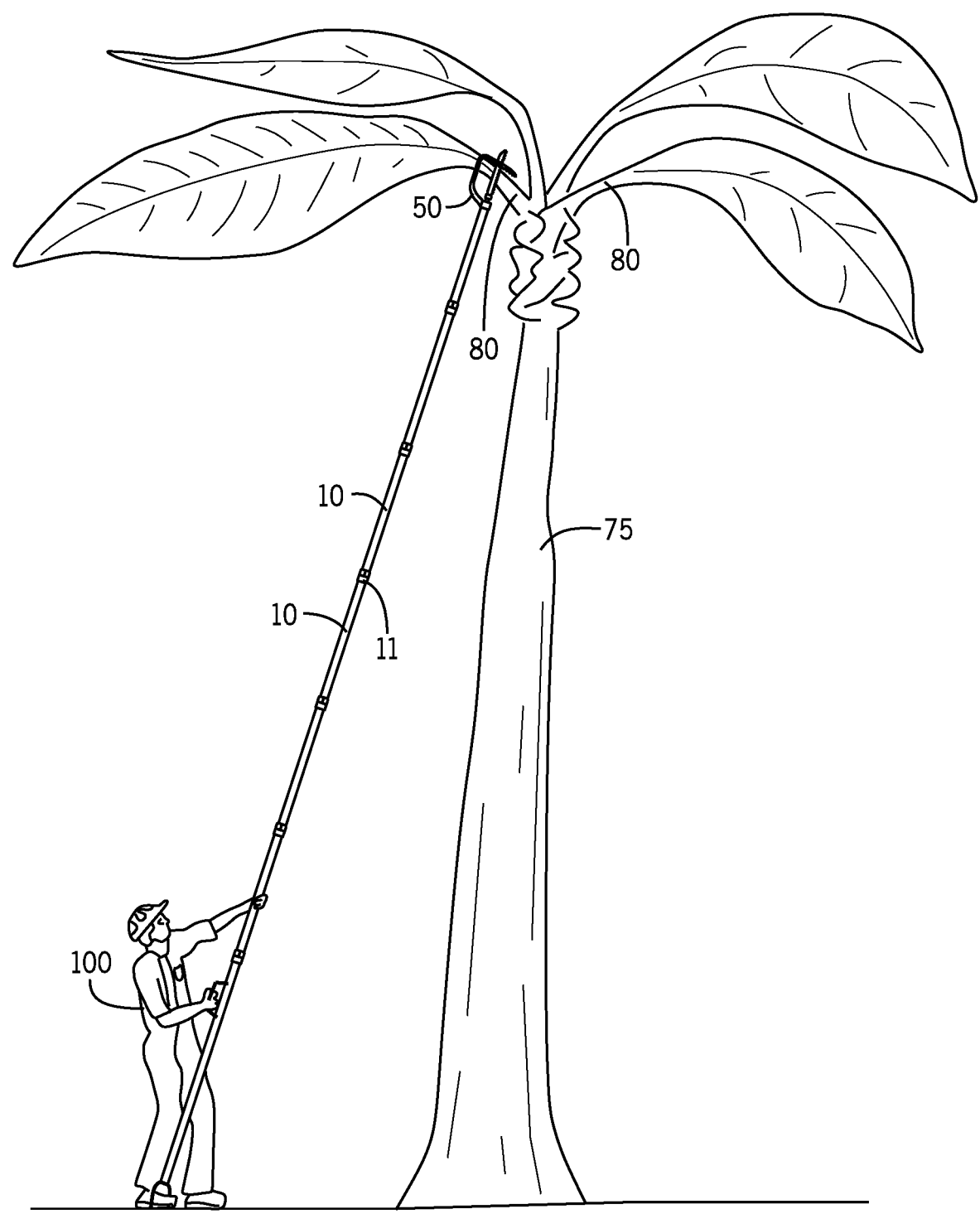
FIG. 7 illustrates a view of the hook and saw of the high reaching pruning apparatus secured to a tree limb.
Figure 9:
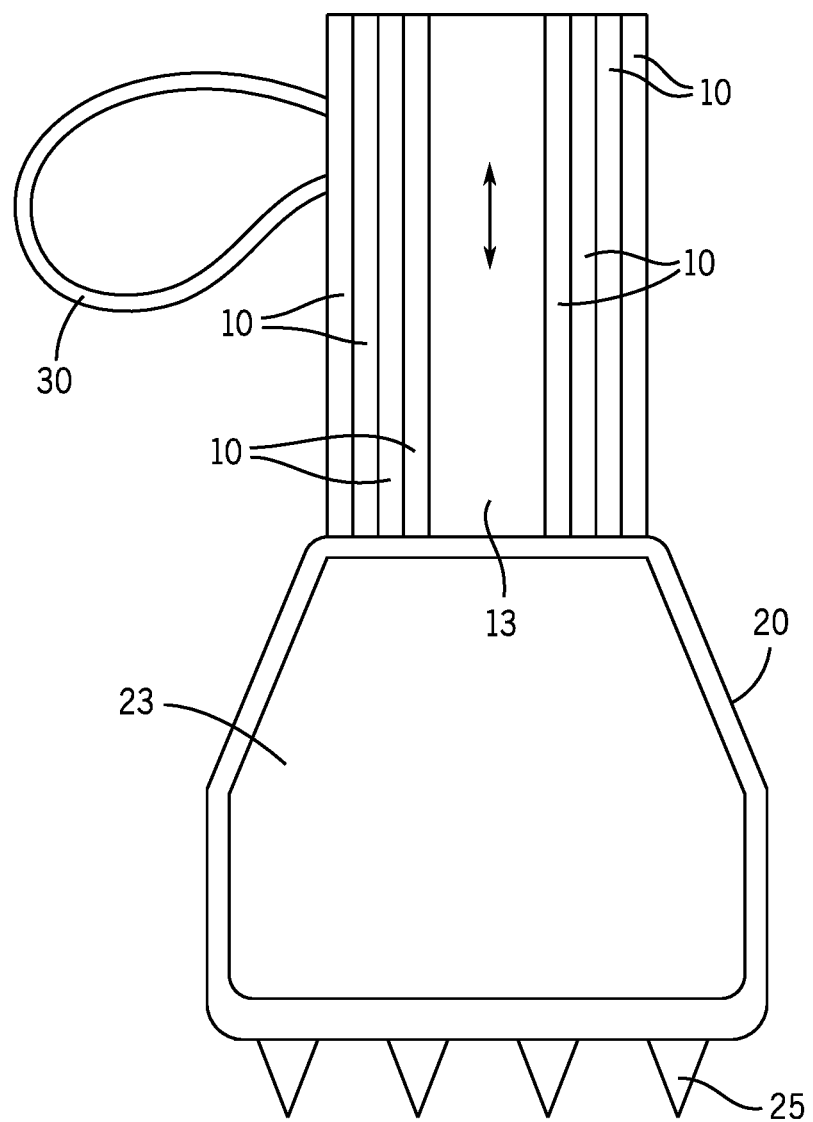
FIG. 9 illustrates view of the high reaching pruning apparatus in the collapsed orientation.

In an embodiment, the high reaching pruning apparatus 1 may telescopingly move from a collapsed orientation (as shown in FIG. 9 without the hook and cutting element) to an expended (or useful) orientation of FIG. 1. Once locked into the expanded orientation of FIG. 1, the high reaching pruning apparatus 1 is especially suitable for pruning a limb 80 (FIG. 7) of a tree 75. Other telescoping devices are often assembly on sight in an horizontal manner and then require a great deal of lifting power to lift the device into a vertical orientation. The present device may be placed in a vertical manner and then may vertically telescopingly expand (via a power motor in one embodiment), therein requiring much less lifting power or space. In an embodiment, the present apparatus 1 may retract from, for example, six feet to one hundred feet to reach very high trees.

In an embodiment, the apparatus 1 may have a first end 15 and a second end 16. Located at the first end 15 of the apparatus 1 may be a hook 50. The hook 50 may be generally u-shaped having a top 51 (FIG. 3), a bottom 52, a front 53 and a back 54 wherein the back 54 runs parallel to the plurality of individual sections 10.

Figure 3:
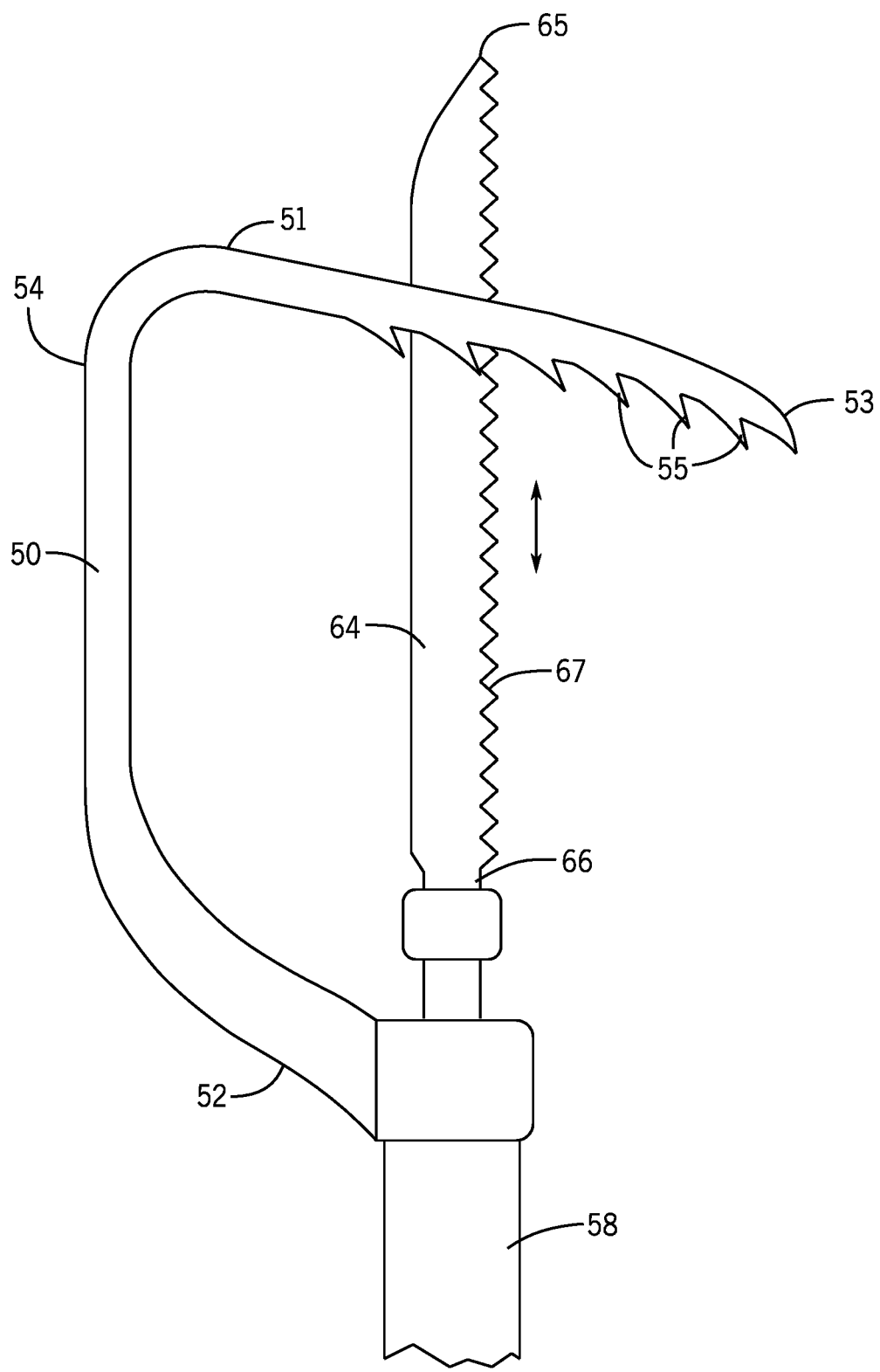
FIG. 3 illustrates a detailed view of the hook and saw of the high reaching pruning apparatus.
Figure 4:
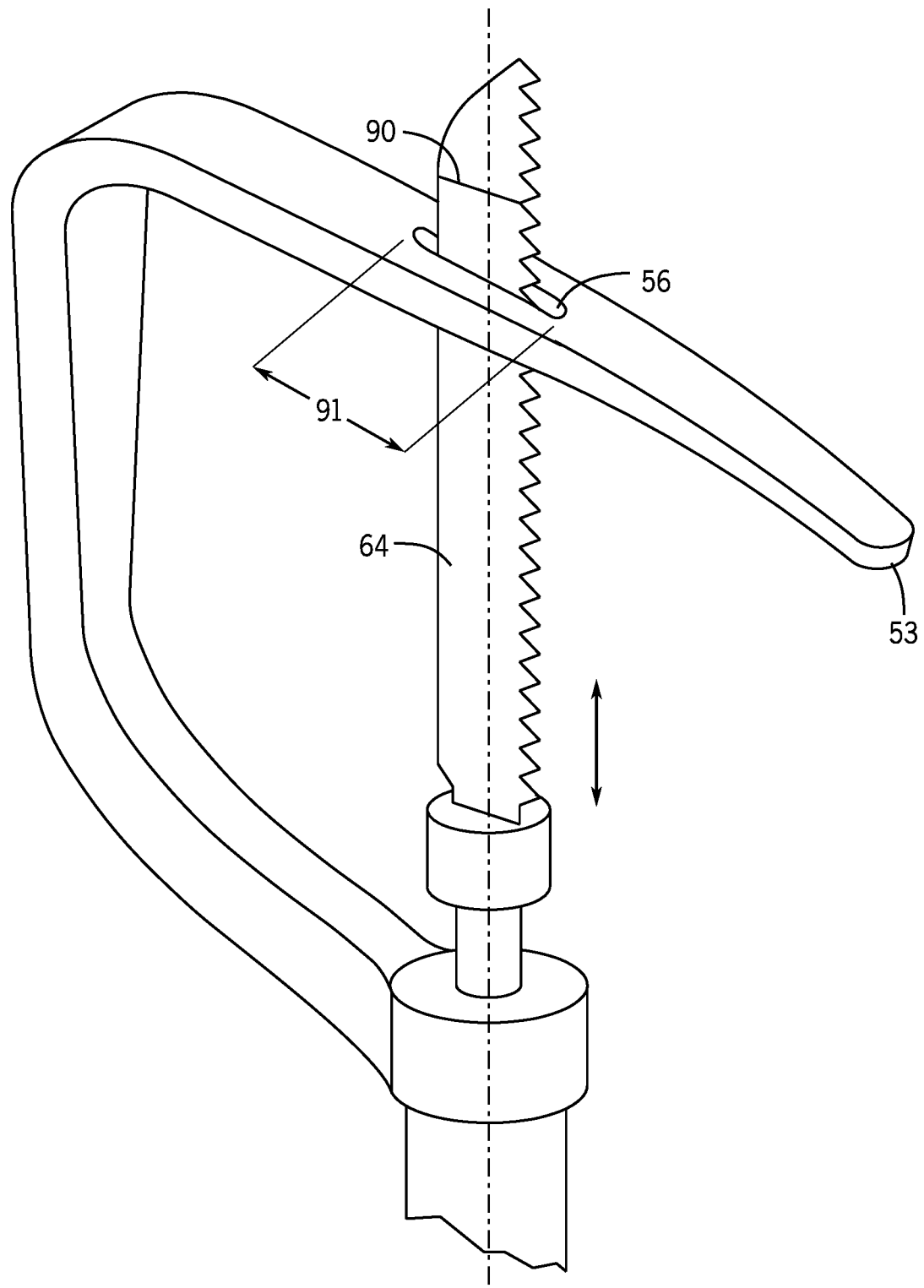
FIG. 4 illustrates a perspective view of the hook and saw of the high reaching pruning apparatus.

In an embodiment, the top 51 of the u-shaped hook 50 may have an opening 56 having a length 91 (FIG. 4). The length 91 of the opening 56 may be greater than the width 90 of the cutting device 64 so as to allow the movement of the cutting device 64. In an embodiment, the front 53 of the hook 50 may extend forward beyond the teeth 67 of the cutting device 64 for better stabilization. In one embodiment, the top 51 of the hook 50 may be angled slightly downward (as shown in FIG. 3) to avoid the hook 50 slipping during use. More specifically, the top 51 of the hook 50 may be less than ninety degrees with respect to the back 54 of the hook 50 for increased stability during use.

Toward the front 53 of the hook 50, on the underside of the top 51 of the hook 50, the device 1 may have a plurality of teeth 55. The teeth 55 may be used to grasp onto tree limps 80 and to secure the hook 50, and therefore stabilize entire device 1 while the device 1 is in use cutting the tree limb 80. In particular, prior art trimming devices violently and dangerously shake during the cutting process from the movement of the cutting saw, whereas the hook 50 and teeth 55 of the present device 1 therein prevent that violent and dangerous shaking. In an embodiment, the plurality of teeth 55 are angled, not perpendicular to the top 51 of the hook 50. The non-perpendicular manner of the teeth 55 better allow the hook 50 to be secured to a tree limb 80 during the cutting process. The top 51 or the hook 50 may also support the weight of the device 1 while the pruning is taking place.

In an embodiment, a cutting device 64, such as a saw, may be located at the first end 15 of the apparatus 1. The cutting device 64 may have a first end 65 (FIG. 3), a second end 66 and a length. A plurality of teeth 67 may be located on the cutting device 64. The first end 65 of the cutting device 64 may always remain above the stationary hook 50 when operational, despite the first end 65 of the cutting device 64 moving up and down during the cutting process.

In an embodiment, an internal motor may move the cutting device 64 rapidly upward and downward with respect to the stationary hook 50. As a result, the cutting device 64 may cut the limb 80 of a tree 75. As stated above, the hook 50 may stabilize the cutting device 64 during use so that the apparatus 1 does not have excessive shake which the cutting device 64 is in use. Preferably, the apparatus 1 is electrically powered having an internal battery for cordless use, but may also be gas powered or may require an electrical cord.

In an embodiment, the cutting device 64 may be especially light weight. Further, the cutting device 64 of the present apparatus may have, for example, a stroke length of one and a half to two and a half inches, which is greater than a standard one and one-eighth stroke length. The longer stroke length of the present cutting device 64 allows for more effective cutting of the tree.

In one embodiment, located at the second end 16 (or bottom) of the apparatus 1 may be a foot brace 20 (FIG. 1). The foot brace 20 may have a top 21 and a bottom 22. In one embodiment, the foot brace 20 is selectively and temporarily removable from the second end 16 of the device 1 so that the device 1 may be used without the foot brace 20 in specific desired situations. The top 21 of the foot brace 20 may be secured to the bottom most individual segment 10 of the main shaft of the device 1. In one embodiment, the bottom 22 of the foot brace 20 may have at least one spike 25 which gets inserted into the ground 400 to better anchor, secure and stabilize the apparatus 1 while the apparatus 1 is in use cutting/pruning tree limbs 80. In an embodiment, the foot brace 20 may have an interior opening 23 for receiving the foot 101 of a worker 100 for stabilization during use.

Figure 5:
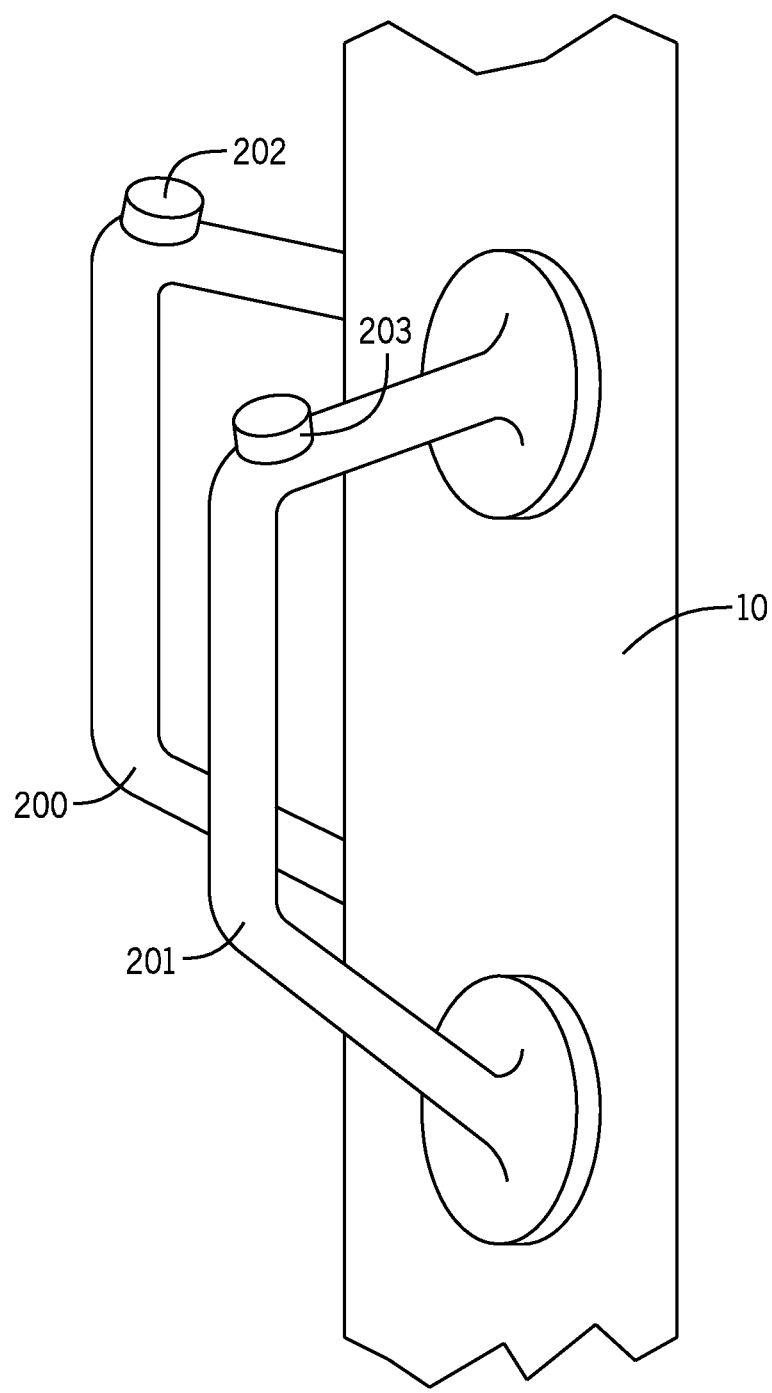
FIG. 5 illustrates a view of one embodiment of handle of the high reaching pruning apparatus.
Figure 6:
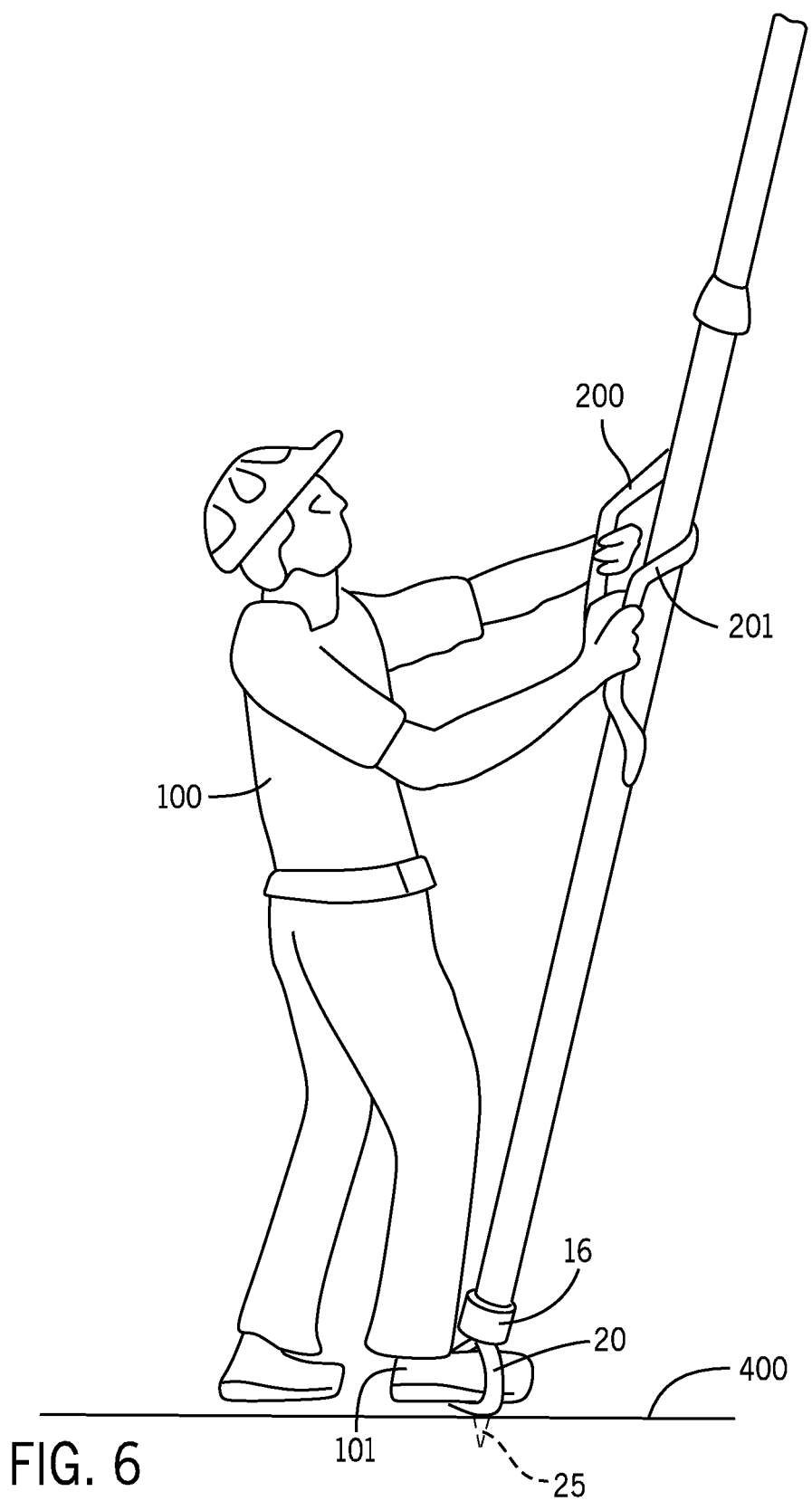
FIG. 6 illustrates a view of a worker using the foot brace of the high reaching pruning apparatus.

In an embodiment, a handle 33 and/or an optional securing rope (or strap) 30 may be secured to the main shaft of the apparatus 1. In an embodiment utilizing both the handle 33 and the securing rope 30, the handle 33 and the rope 30 are on opposing sides of the main shaft so that the device may be be both easily grasped and secured to a tree during use. The handle 33 may allow a user to grasp, secure, move and operate the apparatus 1 during use while the optional securing rope 30 may be used to secure the apparatus around the trunk of a tree 75 for extra stability during use. FIG. 5 shows an alternative embodiment of the handle of FIG. 1. In the alternative embodiment of the handle of FIG. 5, a first handle 200 and second handle 201 may be present. The first and second handle 200, 201 may have power buttons 202 which may control both the upward and/or downward telescoping movement of the individual segments 10 of the apparatus 1 as well as control the cutting device 64. In an embodiment, the handles 33, 200, 201 may have a non-slip grip which allows for better control of the apparatus 1.

FIG. 9 illustrates a view of the high reaching pruning apparatus in the collapsed orientation (without the hook and cutting device shown). While in the collapsed orientation, the individual sections 10 may telescopically be condensed. In this condensed orientation, the apparatus 1 is especially suitable for transportation. Further, because the weight of the apparatus 1 in the expanded orientation of FIG. 1 may result in a top-heavy pole, it is generally preferable that the apparatus 1 first be rested on the ground vertically and then expanded vertically while the user's foot 101 is in the foot brace 20. In particular, during use, a worker may place the apparatus 1 (in the collapsed orientation of FIG. 9) vertically on the ground and may insert his/her foot 101 into the foot brace 20. A power button may then be used to allow the telescoping sections 10 to mechanically expand vertically. After use, a second button may allow the apparatus to return to the collapsed orientation of FIG. 9 so that the apparatus 1 may be easily transported. In an embodiment, the telescoping plurality of sections 10 may have an internal drive system 600 that may control the upward and downward movement of the cutting device 64.

Figure 8:
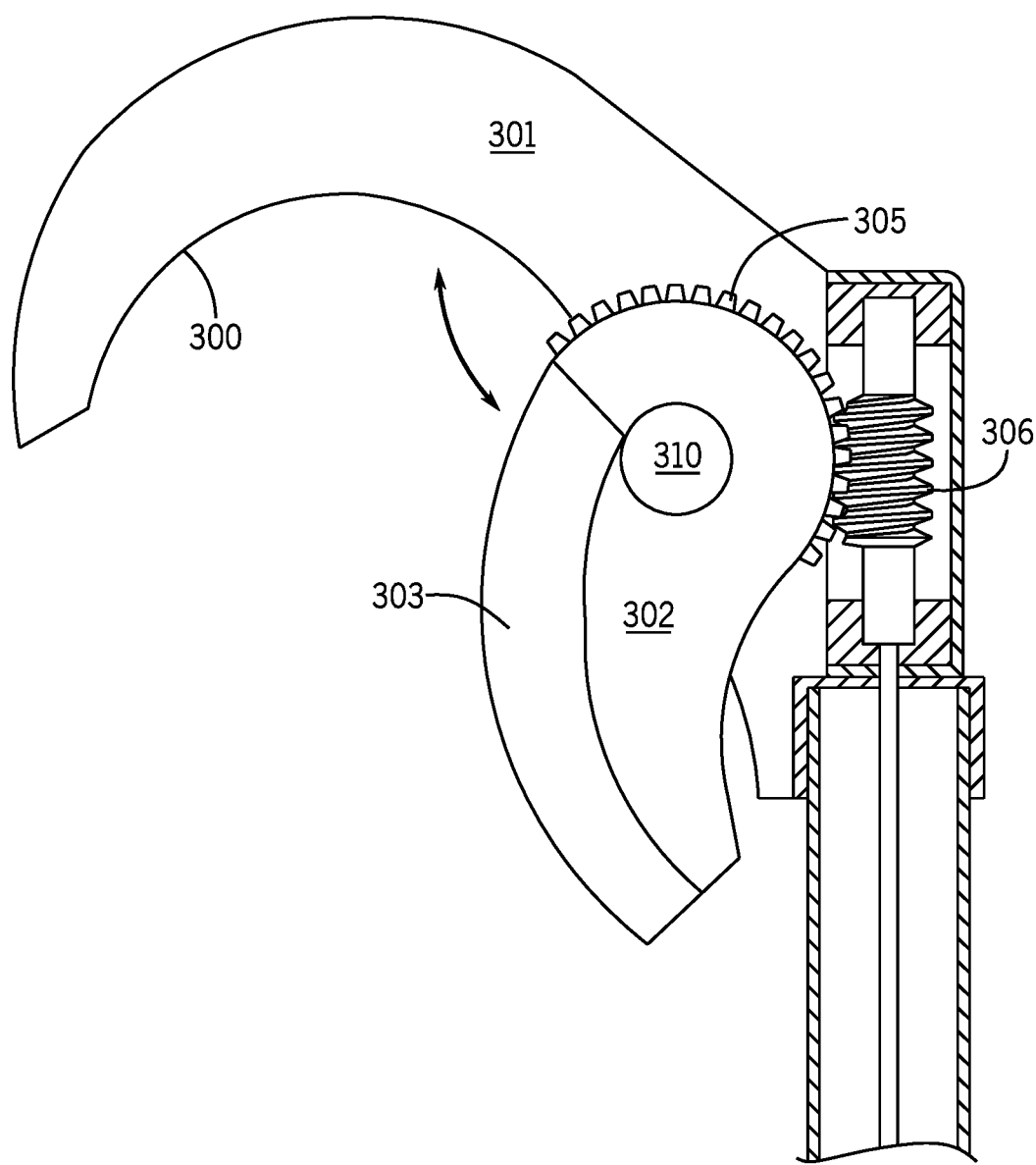
FIG. 8 illustrates an internal view of an alternative cutting tool of the high reaching pruning apparatus.

Finally, referring now to FIG. 8, in an embodiment, an alternative cutting device (other than the saw of FIGS. 1-7) may be used with the apparatus 1. Further, the cutting device 64 may be removed and replaced with a new cutting device 64 after the current cutting device 64 is worn. In one embodiment, the cutting device 64 of FIGS. 1-7 may be removed and replaced with a snipping unit 301 or other cutting devices (not shown). The snipping unit 201 may have a first blade 300 and a second blade 302 and may rotate at a pivot pin 310. The second blade 302 may have a cutting surface 303 that interacts with the first blade 300 to cut, for example, a tree limb/branch 80 or portion of a tree 75. The second cutting blade 302 may be controlled by a screw mechanism 306 which interacts with teeth 305 of the second blade 302.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:

1. A pruning apparatus comprising:
a shaft having a top end and a bottom end and a side having a length extending from the top end to the bottom end;
a hook having a front, a back, a top having an underside and a bottom located on the top end of the shaft;
a cutting element having a first end a second end located at the top end of the shaft; and
a foot brace located at the bottom of the shaft wherein the foot brace has a top, a bottom, a first side and a second side forming an opening for receiving a foot of a user; and
at least one spike located on the bottom of the foot brace wherein the spike is capable of securing the foot brace to the ground.

2. The pruning apparatus of claim 1 wherein the shaft is a telescoping collapsible shaft comprising a plurality of multiple units.

3. The pruning apparatus of claim 1
wherein the cutting element continuously moves from a first position to a second position with respect to the shaft.

4. The pruning apparatus of claim 1 wherein the first end of the cutting element is located above the top of the hook.

5. The pruning apparatus wherein the cutting element passes through an opening slit of the top of the hook.

6. The pruning apparatus of claim 1 further comprising: a handle located on the shaft.

7. The pruning apparatus of claim 1 further comprising: a plurality of teeth located on the underside of the top of the hook wherein the plurality of teeth of the underside of the top of the hook are capable of grasping a portion of a tree.

8. The pruning apparatus of claim 7 wherein the plurality of teeth have a front and a back and wherein neither the front nor the back of the teeth are not perpendicular to the hook.

9. The pruning apparatus of claim 6 further comprising: at least one power button on the handle wherein the power button controls the cutting element.

10. The pruning apparatus of claim 1 further comprising: a securing strap secured to the shaft wherein the securing strap is capable of being secured around a tree to stabilize the pruning apparatus during pruning.

11. The pruning apparatus of claim 1 wherein the cutting element is removable and replaceable.

12. The pruning apparatus of claim 1 wherein the top of the hook is not perpendicular to the back of the hook.

* * * * *